Figure 1:
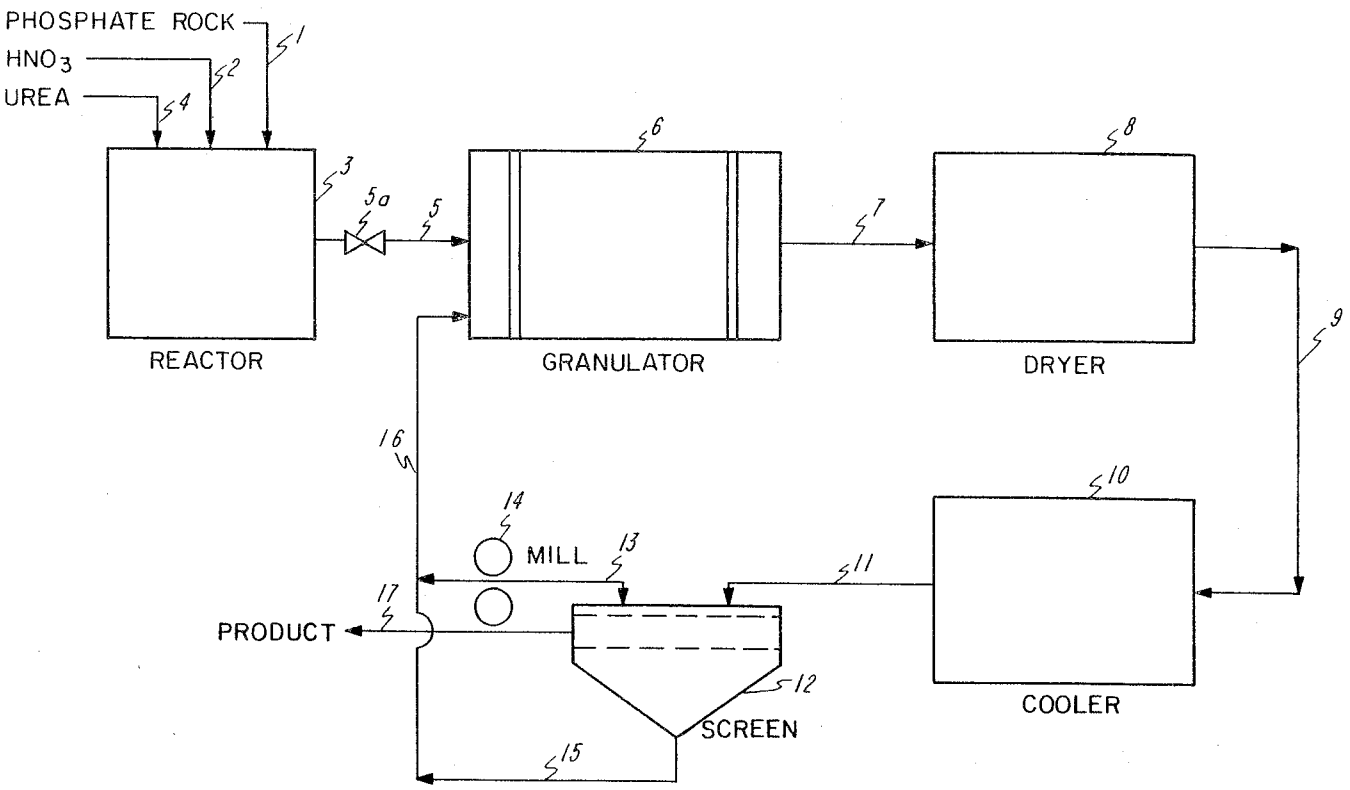

United States Defensive Publication [19] (H) [11] T105,301

Sullivan et al. [43] Apr. 2, 1985

[54] PROCESS FOR THE PRODUCTION OF SOLID UREA-NITRIC PHOSPHATE FERTILIZER PRODUCTS

[76] Inventors: Jack M. Sullivan, 106 Patsy Dr.; Yong K. Kim, 230 Roxie Dr., both of Florence, Ala. 35630; Kjell R. Waerstad, Rte. 3, Colbert Heights, Tuscumbia, Ala. 35674

[21] Appl. No.: 612,162

[22] Filed: May 21, 1984

[51] Int. Cl.[3] ..... C05C 9/00; C05B 11/06

[52] U.S. Cl. ..... 71/39; 71/29; 71/50; 564/63

[57] ABSTRACT

The present invention relates to the reaction of phosphate rock with nitric acid and urea to produce nitrogen-phosphorus containing slurries, which slurries may be granulated and dried to produce solid N-P fertilizer products with agronomically advantageous low pHs (1.1-4.0). Products with optimum physical and chemical properties were discovered by investigating the characteristics of each individual material as a function of the nitric acid acidulation ratio (mole ratio $HNO_3$:CaO) and the mole ratio urea:CaO present in each product. Acidulation ratios ranged from 1.2 to 2.1 while ratios urea:CaO ranged from 1.6 to 4.0. Selected products with optimum physicochemical properties are tabulated below:

| Acidulation Ratio $HNO_3$:CaO, M/M | Ratio Urea:CaO, M/M | Grade | Melting Pt, °C. |
|---|---|---|---|
| 1.2 | 2.2 | 23.8—11.7—0 | 137-139 |
| 1.4 | 2.4 | 25.0—11.0—0 | 136 |
| 1.6 | 2.8 | 25.9—9.9—0 | 133-137 |
| 1.8 | 3.0 | 26.4—9.2—0 | 134-135 |
| 2.0 | 3.3 | 27.2—8.7—0 | 130 |
| 2.1 | 3.2 | 36.6—8.8—0 | 125-130 |

| Acidulation Ratio | $P_2O_5$ Solubility, % | | pH of 1% | Critical Relative Humidity |
|---|---|---|---|---|
| $HNO_3$:CaO, M/M | Water | Citrate | solution | at 25° C., % |
| 1.2 | 69.2 | 82.1 | 2.5 | 59.3 |
| 1.4 | 81.8 | 90.0 | 2.4 | 60.9 |
| 1.6 | 88.9 | 91.9 | 2.3 | 60.1 |
| 1.8 | 96.7 | 98.9 | 2.1 | 59.9 |
| 2.1 | 99.0 | 100 | 2.1 | 60.0 |
| 2.1 | 100 | 100 | 2.1 | 59.5 |

The products have excellent storage characteristics. The improved properties of these products result partially from the formation of a new compound, $Ca(H_2PO_4)(NO_3).CO(NH_2)_2$, which was discovered during the course of the investigation that led to the instant invention.

17 Claims, 1 Sheet Drawing,

42 Pages Specification

The file of this unexamined application may be inspected and copies thereof may be purchased (849 O.G. 1221, Apr. 9, 1968).

PROCESS FOR UREA-NITRIC PHOSPHATES